(12) United States Patent
Fujimura et al.

(10) Patent No.: US 9,989,755 B2
(45) Date of Patent: Jun. 5, 2018

(54) METHOD OF PRODUCING OPTICAL MODULE AND OPTICAL MODULE

(71) Applicants: Sumitomo Electric Industries, Ltd., Osaka-shi (JP); Sumitomo Electric Device Innovations, Inc., Yokohama-shi (JP)

(72) Inventors: Yasushi Fujimura, Yokohama (JP); Yutaka Moriyama, Yokohama (JP); Tomoya Saeki, Yokohama (JP); Michio Suzuki, Yokohama (JP); Satoru Kanemaru, Yokohama (JP)

(73) Assignees: Sumitomo Electric Industries, Ltd., Osaka-shi (JP); Sumitomo Electric Device Innovations, Inc., Yokohama-shi (JP)

( * ) Notice: Subject to any disclaimer, the term of this patent is extended or adjusted under 35 U.S.C. 154(b) by 0 days. days.

(21) Appl. No.: 15/226,065

(22) Filed: Aug. 2, 2016

(65) Prior Publication Data
US 2017/0038541 A1 Feb. 9, 2017

(30) Foreign Application Priority Data

Aug. 3, 2015 (JP) .................................. 2015-153138
Aug. 19, 2015 (JP) .................................. 2015-162005

(51) Int. Cl.
*G02B 26/04* (2006.01)
*G02B 6/42* (2006.01)

(52) U.S. Cl.
CPC ........... *G02B 26/04* (2013.01); *G02B 6/4213* (2013.01); *G02B 6/4215* (2013.01);
(Continued)

(58) Field of Classification Search
CPC .... G02B 26/04; G02B 6/4213; G02B 6/4215; G02B 6/4225; G02B 6/4216; G02B 6/4227; G02B 6/4286
See application file for complete search history.

(56) References Cited

U.S. PATENT DOCUMENTS 2,165,341 A * 7/1939 Capstaff .................... G02B 7/10
                                                    359/641
4,823,357 A * 4/1989 Casey .................. G02B 6/4246
                                                    359/568
(Continued)

FOREIGN PATENT DOCUMENTS

JP        2009-177449 A      8/2009
JP        2009177449 A  *    8/2009
(Continued)

OTHER PUBLICATIONS

Langehanenberg et al. Automated measurement of centering errors and relative surface distances for the optimized assembly of micro-optics. Proc. SPIE 7926, Micromachining and Microfabrication Process Technology XVI, 79260E (Feb. 14, 2011).*

*Primary Examiner* — Peter Radkowski
(74) *Attorney, Agent, or Firm* — Venable LLP; Michael A. Sartori; Laura G. Remus

(57) ABSTRACT

A process of installing optical components as precisely aligning optical axes thereof is disclosed. The process, which relates to an optical module having a signal port and/or a local port, and optical components optically coupling the ports with an active device having a built-in photodiode (PD), includes steps of (a) preparing a reference mirror that emulates a housing with a side to which the ports are attached, (b) aligning an optical axis of the auto-collimator with an optical axis of the reference mirror; (c) replacing the reference mirror with the housing; (d) aligning optical axes of the optical components with the optical axis
(Continued)

of the auto-collimator; and (e) installing the optical components within the housing.

12 Claims, 14 Drawing Sheets

(52) U.S. Cl.
CPC .......... *G02B 6/4225* (2013.01); *G02B 6/4216* (2013.01); *G02B 6/4227* (2013.01); *G02B 6/4286* (2013.01)

(56) References Cited

U.S. PATENT DOCUMENTS

| | | | | |
|---|---|---|---|---|
| 5,112,129 A * | 5/1992 | Davidson | ............... | G01B 11/02 356/497 |
| 5,268,741 A * | 12/1993 | Chou | ................. | G01M 11/3172 356/479 |
| 6,094,515 A * | 7/2000 | Miki | .................... | G02B 6/4203 385/31 |
| 6,421,177 B1 * | 7/2002 | Leyva | ................ | G02B 6/29302 359/288 |
| 6,515,750 B1 * | 2/2003 | Malyak | ............. | G01B 9/02068 356/512 |
| 6,539,035 B1 * | 3/2003 | Yoda | .................... | G02B 6/4206 359/619 |
| 6,587,618 B2 * | 7/2003 | Raguin | .................. | G02B 6/322 385/33 |
| 6,600,849 B2 * | 7/2003 | Ducellier | ............. | G02B 6/3586 385/16 |
| 6,816,267 B2 * | 11/2004 | Evans | ................. | G01B 21/042 356/512 |
| 6,882,430 B2 * | 4/2005 | Hill | .................... | G01B 9/02019 356/490 |
| 6,906,784 B2 * | 6/2005 | Hill | .................... | G01B 9/02019 355/53 |
| 7,027,162 B2 * | 4/2006 | Lau | .................... | G01B 9/02068 356/498 |
| 7,057,738 B2 * | 6/2006 | Millerd | ................ | G01B 11/303 356/495 |
| 7,076,132 B2 * | 7/2006 | Ryall | .................... | G02B 6/2937 385/31 |
| 7,251,041 B2 * | 7/2007 | Hill | .................... | G01B 9/02019 356/498 |
| 7,253,897 B2 * | 8/2007 | Moon | ....................... | G01J 3/02 356/308 |
| 7,257,902 B2 * | 8/2007 | Gao | .................... | G03F 7/70775 33/1 M |
| 7,411,730 B2 * | 8/2008 | Winterot | .................... | G01J 3/02 359/368 |
| 7,463,828 B2 * | 12/2008 | Moon | ....................... | G01J 3/02 359/17 |
| 7,502,127 B2 * | 3/2009 | Gao | ........................ | G01D 5/28 250/237 G |
| 7,581,305 B2 * | 9/2009 | Geuppert | ............ | B24B 13/0055 29/592.1 |
| 8,380,075 B2 * | 2/2013 | Sakigawa | ............ | G02B 6/4201 398/128 |
| 8,792,044 B2 * | 7/2014 | Imai | ..................... | G02B 13/001 348/335 |
| 8,982,355 B2 * | 3/2015 | Choi | ........................ | G01J 9/02 356/451 |
| 2001/0048705 A1 * | 12/2001 | Kitaoka | ............. | G02B 6/12004 372/50.11 |
| 2002/0076136 A1 * | 6/2002 | Ducellier | ............. | G02B 6/3586 385/17 |
| 2002/0110328 A1 * | 8/2002 | Bischel | ................ | G02B 6/4201 385/49 |
| 2002/0131699 A1 * | 9/2002 | Raguin | .................. | G02B 6/322 385/33 |
| 2002/0181102 A1 * | 12/2002 | Leyva | ................ | G02B 6/29302 359/487.02 |
| 2003/0007148 A1 * | 1/2003 | Moon | ....................... | G01J 3/02 356/328 |
| 2004/0114865 A1 * | 6/2004 | Ryall | .................... | G02B 6/2937 385/39 |
| 2004/0246477 A1 * | 12/2004 | Moon | ....................... | G01J 3/02 356/300 |
| 2005/0046864 A1 * | 3/2005 | Millerd | ................ | G01B 11/303 356/495 |
| 2006/0033931 A1 * | 2/2006 | Lau | .................... | G01B 9/02068 356/493 |
| 2006/0203251 A1 * | 9/2006 | Millerd | ................ | G01B 11/303 356/495 |
| 2006/0274434 A1 * | 12/2006 | Mino | .................... | G02B 6/4214 359/811 |
| 2007/0035267 A1 * | 2/2007 | Gao | .................... | G03F 7/70775 318/649 |
| 2007/0041024 A1 * | 2/2007 | Gao | ........................ | G01D 5/28 356/616 |
| 2010/0166427 A1 | 7/2010 | Jeong | | |
| 2010/0209103 A1 * | 8/2010 | Sakigawa | ............ | G02B 6/4201 398/45 |
| 2010/0214639 A1 * | 8/2010 | Watson | ................ | G02B 21/002 359/213.1 |
| 2012/0189306 A1 * | 7/2012 | Du | ........................ | G02B 6/4215 398/65 |
| 2012/0218455 A1 * | 8/2012 | Imai | ..................... | G02B 13/001 348/340 |
| 2013/0148970 A1 * | 6/2013 | Nakajima | ............... | H04J 14/02 398/79 |
| 2014/0268305 A1 * | 9/2014 | Tazawa | ..................... | G02F 1/31 359/320 |
| 2015/0309272 A1 * | 10/2015 | Cobb | .................... | G02B 6/4256 385/93 |
| 2015/0365175 A1 * | 12/2015 | Kawamura | ............. | H04J 14/04 398/79 |
| 2015/0365176 A1 * | 12/2015 | Kawamura | ............ | H04B 10/676 29/825 |

FOREIGN PATENT DOCUMENTS

JP        2009-244833 A     10/2009
WO     WO-2011/027895 A1    3/2011

* cited by examiner

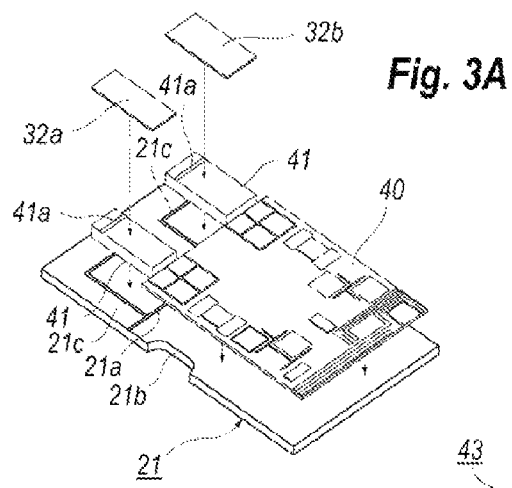
Fig. 3A
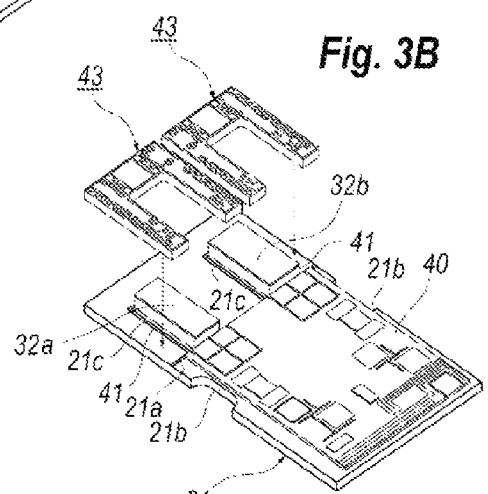
Fig. 3B
Fig. 3C
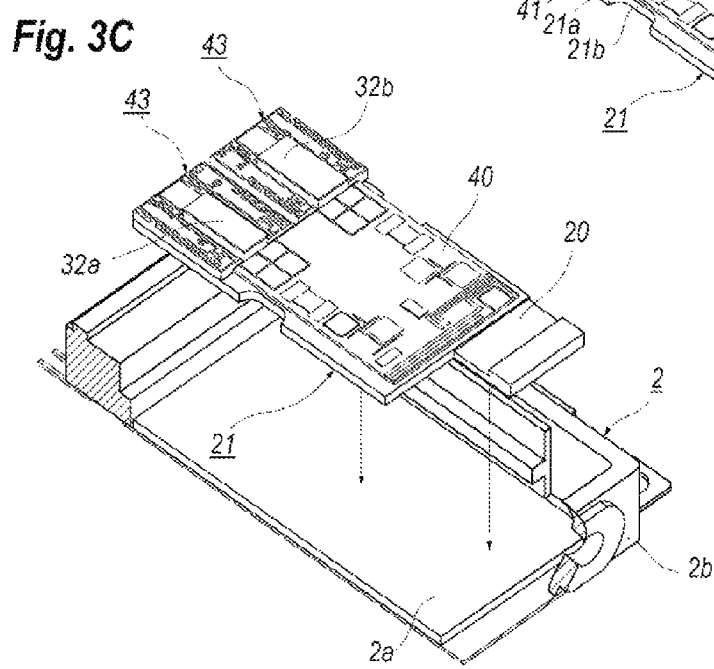

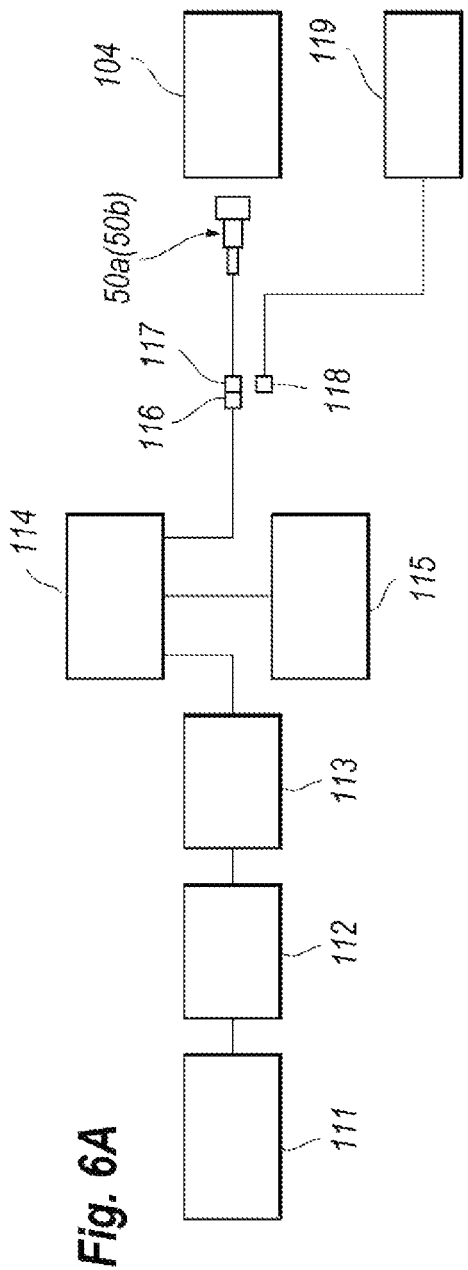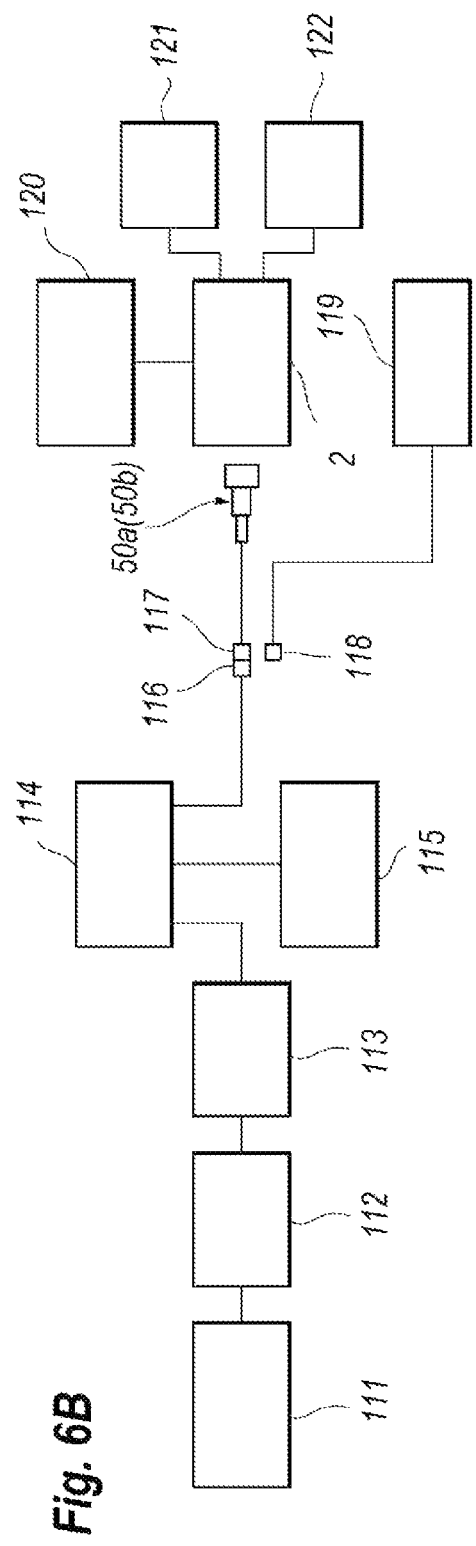
Fig. 6A
Fig. 6B

METHOD OF PRODUCING OPTICAL MODULE AND OPTICAL MODULE

BACKGROUND OF THE INVENTION

1. Field of the Invention

The present invention relates to a method of producing an optical module, in particular, a method of producing a coherent optical module.

2. Background Arts

An international patent application published as WO2011/027895 has disclosed an optical de-modulator of a type of the planar light wave circuit (PLC) and an optical transmission system implementing the PLC de-modulator. The PLC modulator disclosed therein receives a coherent optical signal that multiplexes two optical signals each having a polarization plane different from each other and modulated by phases of light. An optical module implementing such devices and additional optical components like a mirror and/or a beam splitter (BS), the optical components are sometimes necessary to be precisely aligned with respect to a housing installing them.

SUMMARY OF THE INVENTION

One aspect of the present application relates to a process of assembling an optical, where the optical module provides an optical port, a side to which the optical port is attached, an optical device, and a plurality of optical components that optically couples the optical port with the optical device. The process includes steps of: aligning an optical axis of an auto-collimator with an optical axis of a reference mirror, where the reference mirror emulates the optical module; replacing the reference mirror with the optical module; aligning optical axes of the optical components with the optical axis of the auto-collimator; and installing the optical components within the optical module.

Another aspect of the present application relates to an optical module. The optical module receives signal light in a signal port thereof and local light in a local port thereof. The signal port secures a concentrating lens. The optical module comprises first and second optical hybrids, an optical coupling system, and a variable optical attenuator. The first and second optical hybrids each interferes the signal light with the local light. The optical coupling system optically couples the signal light and the local light with the first and second optical hybrids. The optical coupling system provides a collimating lens in a front end for the signal light. The VOA, which is disposed between the signal port and the collimating lens of the optical coupling system, attenuates the signal light. A feature of the optical module of the present application is that the signal light concentrated by the concentrating lens has a beam waist at a position of the VOA.

BRIEF DESCRIPTION OF THE DRAWINGS

The foregoing and other purposes, aspects and advantages will be better understood from the following detailed description of a preferred embodiment of the invention with reference to the drawings, in which:

FIG. 3A shows a process of mounting a carrier on a base, FIG. 3B shows a process, which is subsequent to the process shown in FIG. 3A, of fixing wiring substrates each providing die capacitors and interconnections thereon to the carrier, and FIG. 3C shows a process of installing the base within a housing;

FIG. 6A shows a functional block diagram of a setup for preparing the test beam; and FIG. 6B shows a functional block diagram of a setup for aligning the optical components;

FIG. 12B shows a front view, while, FIG. 12C shows a rear view thereof, and FIG. 12D magnifies the aperture of the VOA in a front view thereof;

DESCRIPTION OF EMBODIMENTS

Next, some preferable examples according to the present invention will be described as referring to drawings. In the description of the drawings, numerals or symbols same with or similar to each other will refer to elements same with or similar to each other without duplicating explanations.

Figure 1:
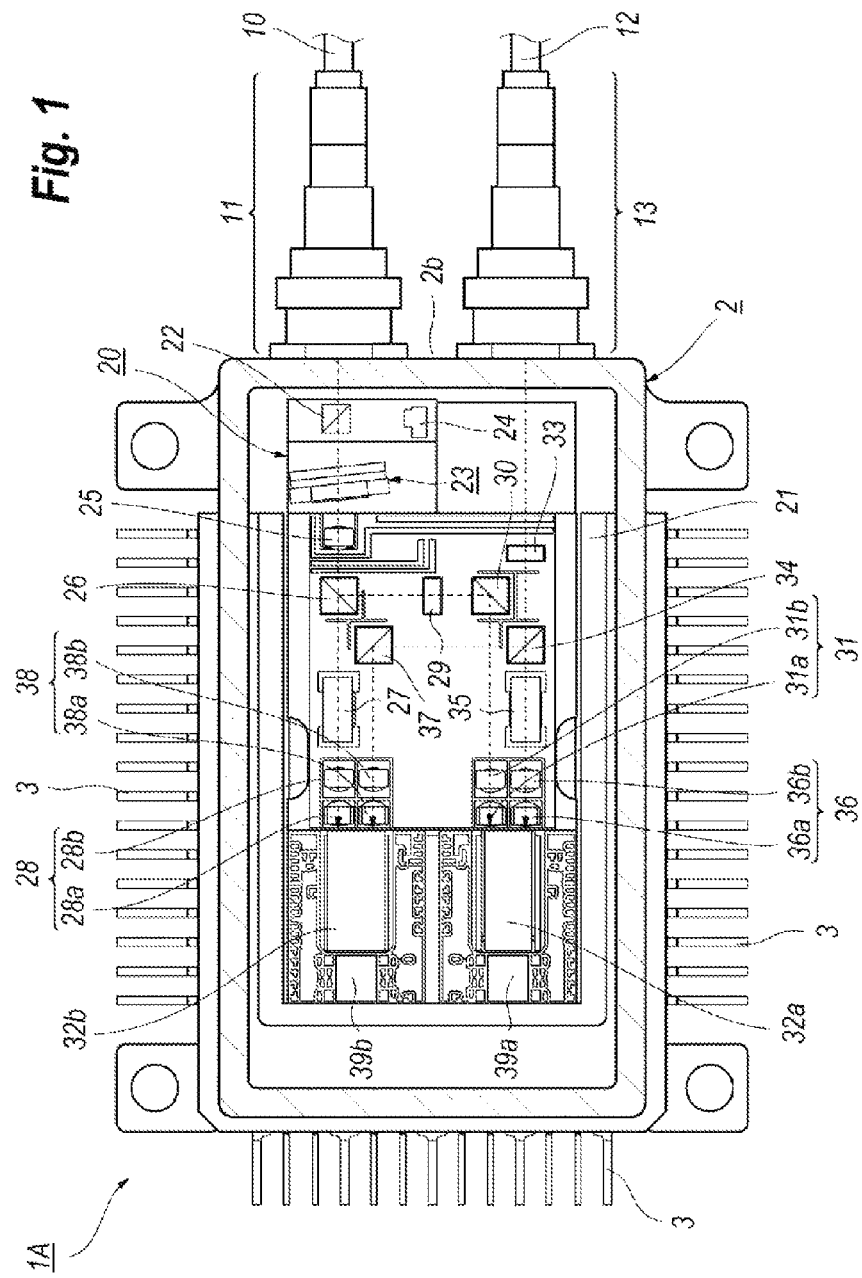
FIG. 1 is a plan view of an inside of an optical module according to embodiment of the present invention.
Figure 2:
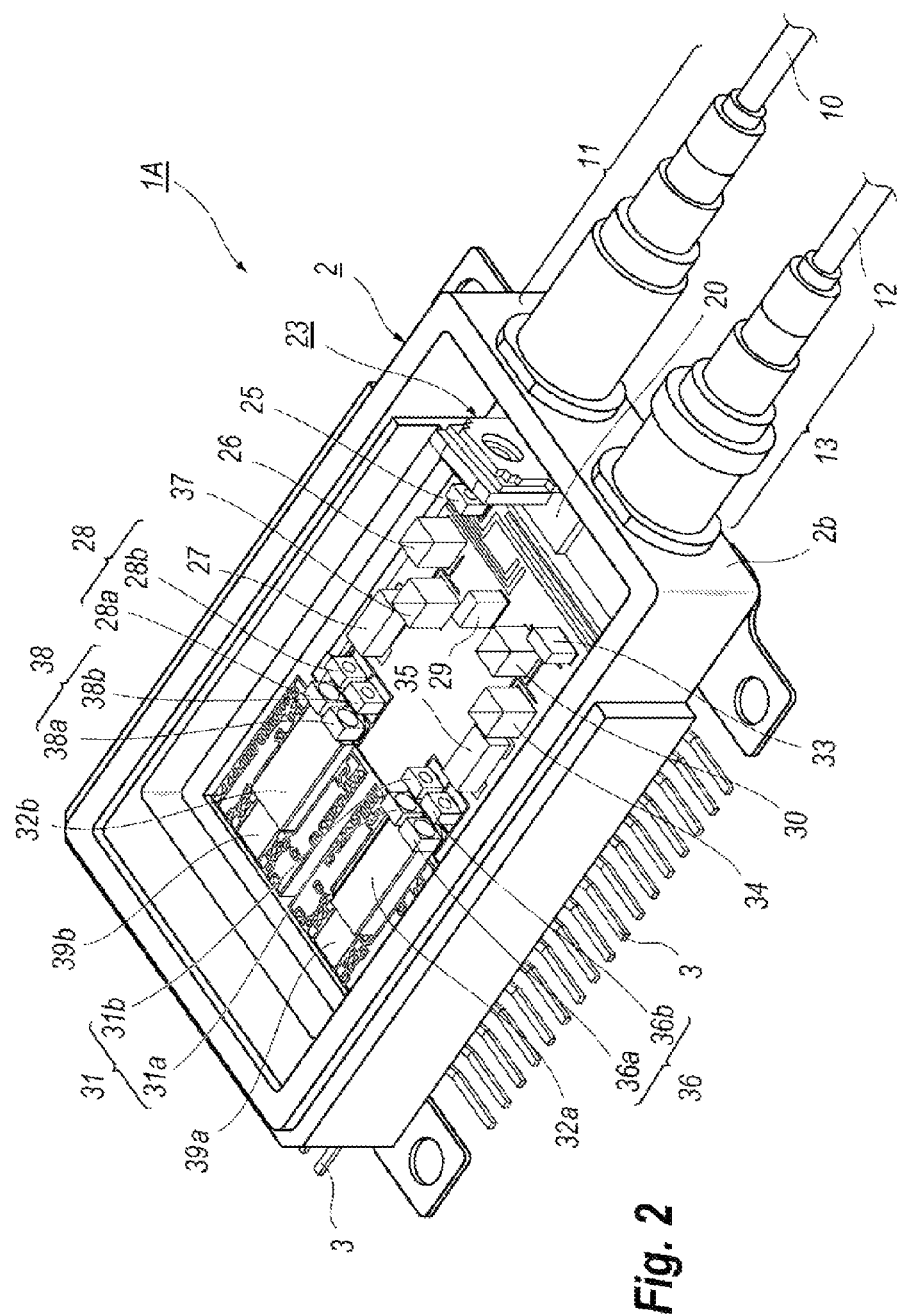
FIG. 2 is a perspective view of the optical module shown in FIG. 1.

FIG. 1 is a plan view of an inside of an optical module 1A according to embodiment of the present invention, and FIG. 2 is a perspective view thereof. The optical module 1A of the present embodiment provides a box-shaped housing 2, and a signal port 11 and a local port 13 in one side 2b of the housing 2. Descriptions below sometimes assume that a direction "forward" and/or "front" is a side where two ports, 11 and 13, are provided; while, another direction "rear" and/or "back" is a side opposite thereto.

The signal port 11, which is coupled with a single mode fiber (SMF) 10, receives signal light SG from the SMF 10; while, the local port 13, which is coupled with a polarization maintaining fiber (PMF) 12, receives local light LO from the PMF 12. The signal light SG and the local light LO are brought within the housing 2 through the signal port 11 and the local port 13, respectively.

The housing 2 also provides terminals 3 in rest sides except the front side 2b. The terminals 3 includes those for outputting data recovered from the signal light, those for supplying power and biases in electronic circuits installed within the housing 2, and the ground.

The signal port 11 provides a cylindrical sleeve that receives a ferrule secured in an end of the SMF 10, and a lens holder that secures a concentrating lens therein. The signal port 11 is assembled with the housing 2 by fixing the lens holder to the front side 2b of the housing 2. The signal light provided from the SMF 10 may be guided within the housing 2 as being concentrated by the lens secured in the lens holder.

The local port 13 also provides a cylindrical sleeve that receives a ferrule secured in an end of the PMF 12, and a lens holder that secures a collimating lens therein. The local port 13 is assembled with the housing 2 by fixing the lens holder thereof to the front side 2b of the housing 2. The local light provided from the PMF 12 enters into the housing 2 as being collimated by the collimating lens in the lens holder.

The optical module 1A further provides two optical hybrids, 32a and 32b, and some optical components for coupling the two optical hybrids, 32a and 32b, with respective ports, 11 and 13, where the optical components include a polarization beam splitter (PBS) 26, a beam splitter (BS) 34, skew adjustors, 27 and 35, a half-wavelength plate 29, two mirrors, 30 and 37, and four lens systems, 28, 31, 36, and 38. Moreover, the optical module 1A may further provide, between the signal port 11 and the PBS 26, another BS 22, a variable optical attenuator (VOA) 23, and a collimating lens 25.

The BS 22 splits the signal light coming from the signal port 11 into two beams, one of which is detected by a monitor photodiode (mPD) 24 that generates an electrical signal depending on power of the signal light. The BS 22 shows a split ratio of less than 10%, typically around 5%.

The VOA 23 attenuates the signal light passing the BS 22, namely, rest portion of the signal light not split to the mPD 24. The VOA 23 may be controlled in the attenuation thereof by electrical signal provided out of the housing 2. For instance, when a system implementing the optical module 1A detects excess power in the signal light through the output of the mPD 24, the system increases the attenuation of the VOA 23, which decreases the power received by the optical hybrids, 32a and 32b.

The collimating lens 25 collimates the signal light passing the VOA 23. Specifically, the signal light is preferably concentrated by the concentrating lens secured in the lens holder of the signal port 11 such that a beam waist of the concentrated signal light corresponds to the position of the VOA 23. Thus, the field size of the signal light is enough concentrated compared with an aperture of the VOA 23. The collimating lens 25 may collimate thus concentrated signal light. Because the optical components provided in downstream of the VOA 23 are operable for a collimated beam, the optical hybrids, 32a and 32b, may show enough optical coupling efficiency for the signal light.

The BS 22, the VOA 23, and the mPD 24 are installed in the housing 2 through a VOA carrier 20 that provides a step in a top surface thereof. The BS 22 and the mPD 24 are set on a higher surface of the step, while, the VOA 23 is on a lower surface.

The PBS 26 splits the signal light coming from the collimating lens 25 depending on the polarization. For instance, one component of the signal light having the polarization in parallel to a bottom of the housing 2 passes the PBS 26, while, rest component of the signal light whose polarization is perpendicular to the bottom of the housing 2 is reflected by the PBS 26. The PBS 26 has a split ratio of 1:1, namely 50%. The relation of the pass and the reflection with respect to the polarization may be optional. The component of the signal light having the polarization perpendicular to the bottom of the housing 2 may pass the PBS 26, while, the rest component having the polarization in parallel to the bottom of the housing 2 may be reflected by the PBS 26. The skew adjustor 27 and the first lens system 28, which interpose between the optical hybrid 32b and the PBS 26, may compensate an optical path length for the other component of the signal light reflected by the PBS 26 and entering the other optical hybrid 32a. That is, the optical path length from the PBS 26 to the optical hybrid 32b is shorter than the other optical path length from the PBS 26 to the other optical hybrid 32a by a distance from the PBS 26 to a first reflector 30. The skew adjustor 27 may compensate this path difference by delaying the signal light entering the optical hybrid 32b. The component of the signal light passing the PBS 26 finally enters the optical hybrid 32b by passing the skew adjustor 27 and concentrated by the first lens system 28, which arranges two lenses, 28a and 28b, sequentially.

The half-wavelength plate 29, the first mirror 30, and the second lens system 31 are disposed on an optical path for the other component of the signal light from the PBS 26 to the other optical hybrid 32a. The other component of the signal light reflected by the PBS 26 passes the half-wavelength plate 29, which rotates the polarization plane by 90°, that is, the other component of the signal light passing the half-wavelength plate 29 has the polarization plane same with that for the component of the signal light passing the PBS 26. The other component of the signal light passing the half-wavelength plate 29 enters the optical hybrid 32a reflected by the first mirror 30 by 90° and concentrated by the second lens system 31. The second lens system 31 also provides two lenses, 31a and 31b, sequentially arranged along optical axes thereof. The first mirror 30 may be a type of cubic mirror, and/or a slab mirror.

The optical module 1A further provides, for optically coupling the local port 13 to two optical hybrids, 32a and 32b, a BS 34, a skew adjustor 35, the third lens system 36, a second mirror 37, and the fourth lens system 38. Moreover, the optical module 1A further provides a polarizer 33 in the front end thereof, namely, between the local port 13 and the BS 34.

The polarizer 33 may define the polarization plane of the local light coming from the local port 13. Several reasons may shift or rotate the polarization plane of the local light from the designed direction, which is typically in parallel or perpendicular to the bottom of the housing 2. Also, the local light is generally generated by a semiconductor laser diode (LD), and an LD naturally outputs laser light with the elliptical polarization, whose major axis is far greater than a minor axis. The polarizer 33 set in the front end of the optical system may align the polarization plane of the local light in the designed direction, namely, in perpendicular or parallel to the bottom of the housing 2.

The BS 34 splits the local light coming from the polarizer 33 into two portions, one of which passes the BS 34, while, the other is reflected thereat. Note that the BS 34 does not affect the polarization plane of the split light. That is, the local light passing the BS 34 and the other local light reflected by the BS 34 have the polarization plane same to each other. The BS 34 has a split ratio of 1:1, namely, 50%.

The skew adjustor 35 and the third lens system 36 are interposed between the BS 34 and the optical hybrid 32a. The skew adjustor 35, similar to the aforementioned adjuster 27, may compensate a skew caused by an optical distance from the BS 34 to the second mirror 37. The local light passing the BS 34 enters the optical hybrid 32a passing the skew adjustor 35 and concentrated by the third lens system 36 that provides two lenses, 36a and 36b, sequentially arranges along the optical axes thereof.

The second mirror 37 and the fourth lens system 38 are interposed between the BS 34 and the optical hybrid 32b. The portion of the local light reflected by the BS 34 reaches the local port of the optical hybrid 32b after reflected by the second mirror 37 again and concentrated by the fourth lens system 38. The fourth lens system 38, similar to the first to third lens systems, 28, 31, and 36, provides two lenses sequentially arranged along the optical axis thereof. The second mirror 37 may be a type of cubic mirror, and/or slab mirror.

Thus, the signal light and the local light entering the optical module 1A from the respective ports, 11 and 13, reach the optical hybrids, 32a and 32b, by the optical system described above. The optical hybrids, 32a and 32b, may recover data contained in the signal light by interfering the signal light with the local light and electrically output recovered data in respective differential form of, Ix and /Ix; Qx and /Qx; Iy and /Iy; and Qy and /Qy, where suffixes x and y correspond to the polarizations perpendicular to each other, I and Q correspond to in-phase and in quadrature phase with respect to the local light, and prefix code slash "/" means that a signal has a phase opposite to that of a signal without the slash. That is, one of the optical hybrid 32b may output the signals, Ix, /Ix, Qx, and /Qx recovered from the signal light spilt by the PBS 26, the polarization plane of which is in parallel to the bottom of the housing 2, that is, these four signals, Ix to /Qx, are output from the optical hybrid 32b; while, rest four signals, Iy to /Qy, which are output from the other optical hybrid 32a, are recovered from the other signal light split by the PBS 26, the polarization plane of which is in perpendicular to the bottom of the housing 2.

Next, an assembling process of the optical module 1A will be described as referring to FIG. 3A to FIG. 11B illustrating respective steps of the process.

First, as shown in FIG. 3A, a carrier 40 is mounted on a base 21 out of the housing 2. The base 21, which may be made of, for instance, copper tungsten (CuW), has a rectangular slab. The carrier 40 may be made of, for instance, aluminum oxide (Al$_2$O$_3$), has also a rectangular slab. Eutectic solder such as gold tin (AuSn) may fix the carrier 40 to the base 21. The base 21 in a top thereof provides a groove 21a that partitions the top of the base 21 into an area for mounting the carrier 40 and another area for mounting the optical hybrids, 32a and 32b. Aligning the carrier 40 in a rear edge thereof with a front edge of the groove only by a visual inspection, a position of the carrier 40 relative to the base 20 may be determined. In an alternative, the carrier 40 may be set on the base 21 by aligning the front edge thereof with the front edge of the base 21.

Because the base 21 has a width almost equal to or slightly narrower than an inner width of the housing 2, which makes hard to install the base 21 within the housing, the base 21 preferably provides a waist side 21b with a width thereof narrower than that of a rest portion. The installation of the base 21 within the housing 2 may be facilitated by picking the waist side 21b of the base 21. The carrier 40 in a lateral direction thereof may be aligned by the width of the waist side 21b of the base 21.

Next, the process mounts the optical hybrids, 32a and 32b, on the respective MMI carriers 41. The MMI carriers 41 are rectangular blocks made of ceramics such as aluminum nitride (AlN), aluminum oxide (Al$_2$O$_3$), and so on. The optical hybrids, 32a and 32b, are fixed on the MMI carriers 41 by eutectic alloy of gold tin (AuSn), which is conventional technique in assembling a semiconductor device on an insulating substrate. Then, the MMI carriers 41 with the optical hybrids, 32a and 32b, thereon, are mounted behind the carrier 40 on the base 21. The base 21 provides in the top surface thereof grooves 21c that surround respective areas on which the MMI carriers 41 are placed. The MMI carriers 41 are aligned with those grooves 21c by the visual inspection.

The MMI carrier 41 also provides in a top thereof a groove 41a extending laterally for demarcating a front area from a rear area. The former area overlaps with waveguides formed within the optical hybrid, 32a and 32b; while, the latter area overlaps with photodiodes (PDs) also formed within the optical hybrid, 32a and 32b. The optical hybrid, 32a and 32b, provides a back metal, which is similar to a semiconductor device to be die-bonded on an insulating substrate. However, the back metal sometimes causes a leak current in the PDs. The back metal of the optical hybrid, 32a and 32b, of the present embodiment is physically divided into two areas, one of which corresponds to the front area of the MMI carrier 41, while, a rest of which corresponds to the rear area of the MMI carrier 41. Thus, the optical hybrid, 32a and 32b, of the embodiment not only electrically but physically isolates the back metal by the groove 41a, which efficiently reduces the leak current.

Concurrently with the assembly of the optical hybrids, 32a and 32b, on the MMI carrier 41, the process mounts, also outside the housing 2, die capacitors on respective wiring substrates 43, which may be made of aluminum nitride (AlN), by soldering or using metal pellet of gold tin (AuSn). Then, as FIG. 3B illustrates, one of the wiring substrates 43 is fixed on the base 21 so as to surround the optical hybrid 32a, while, the other of the wiring substrates 43 is also fixed on the base 21 so as to surround the other optical hybrid 32b.

Then, as shown in FIG. 3C which partially cuts the sides of the housing 2, the base 21, on which the carrier 40, the MMI carrier 41, and the wiring substrate 43 are mounted, is set on the bottom 2a of the housing 2. Abutting the front edge of the base 21 against the inside of the side 2b to align the carrier 40 in a direction perpendicular to the optical axes of the ports, 11 and 13, then retreating base 21 backward by a preset amount, the base 21 is installed onto the bottom 2a of the housing 2. As shown in FIGS. 1 and 2, the interiors of the sides provide steps, where upper portions of the steps are made of metal, while, lower portions thereof are made of ceramics to electrically isolate the terminals 3. An inner width between the lower portions is substantially equal to the width of the base 21, while, that between the upper portions is wider than the width of the base 21. Accordingly, the base 21 in the front edge thereof may abut against the upper portion of the front side 2b. The abutting alignment of the base 21 against the front side 2b may show accuracy within ±0.5°. The base 21 may be fixed on the bottom 2a by, for instance, soldering.

Subsequent to the installation of the base 21, the process mounts the VOA carrier 20 on the bottom 2a of the housing 2. Abutting an edge of the VOA carrier 20 against the interior of the side 2b to align the VOA carrier 20 with the housing 2, and retreating the VOA carrier 20 by a preset amount, the process may mount the VOA carrier 20 on the bottom 2a of the housing 2. Thus, the VOA carrier 20 is aligned with the carrier 40, that is, the front edge of the carrier 40 becomes in parallel to the rear edge of the VOA carrier 20. The VOA carrier 20 is fixed on the bottom 2a of the housing also by soldering.

Then, the process installs the amplifiers, 39a and 39b, which are shown in FIGS. 1 and 2, on the wiring substrate 43 by a conventional technique using conductive resin. Exposing an intermediate assembly of the housing 2, the base 21 that mounts the optical hybrids, 32a and 32b, through the MMI carriers 41 and the wiring substrates 43 that mount the amplifiers, 39a and 39b, in a high temperature around 180° C., solvents containing in the resin may be vaporized. Then, the process performs the wire-boding between the built-in PDs in the optical hybrids, 32a and 32b, and the amplifiers, 39a and 39b; and between pads provided on the surfaces of the amplifiers, 39a and 39b, and the terminals 3 in the rear side of the housing 2. Thus, the built-in PDs in the optical hybrids, 32a and 32b, become operable and electrical signals generated by the built-in PDs becomes extractable from the optical module 1A, which enables an active alignment of the optical components using the built-in PDs. The active alignment aligns the optical components such that outputs of the built-in PDs are monitored as practically providing test beams to the optical hybrids, 32a and 32b, through the optical components.

Next, the process prepares a reference mirror 104 that provides a reference surface 104a precisely aligned with a bottom 104b thereof in a right angle. The reference surface 104a and the bottom 104b emulate the side 2b and the back surface of the housing 2, respectively. The reference mirror 104, which may be a rectangular block made of glass, is set on an alignment stage 103 such that the bottom 104b makes closely contact to the alignment stage 103.

Figure 4A:
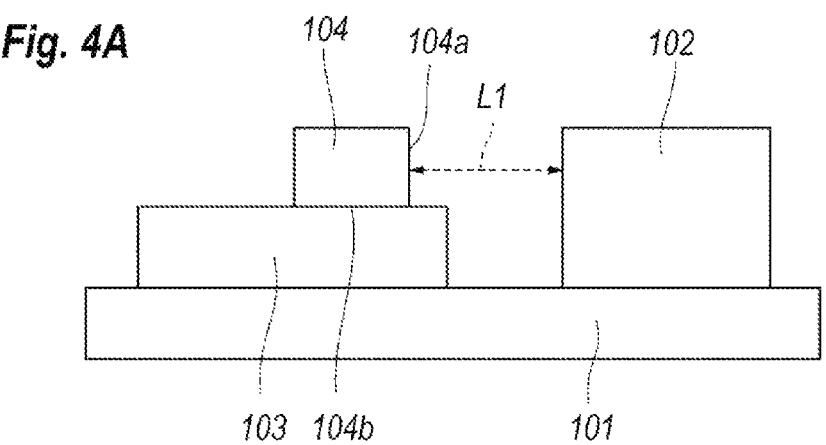
FIG. 4A shows a process of aligning an optical axis of an auto-collimator with a reference mirror.

Then, the auto-collimator 102 in the optical axis thereof is aligned with the normal of the reference mirror 104, as FIG. 4A illustrates. Specifically, the auto-collimator 102 outputs and detects visual laser light L1 and reflected by the reference surface 104a. When the optical axis of the visual laser light L1 fully overlaps with the optical axis of the reflected light, the auto-collimator 102 may detect maximum power. That is, the alignment stage 103 may adjust the rotation and the rolling of the reference mirror 104 with respect to the auto-collimator 102 so as to maximize the visual light reflected by the reference surface 104a.

Figure 4B:
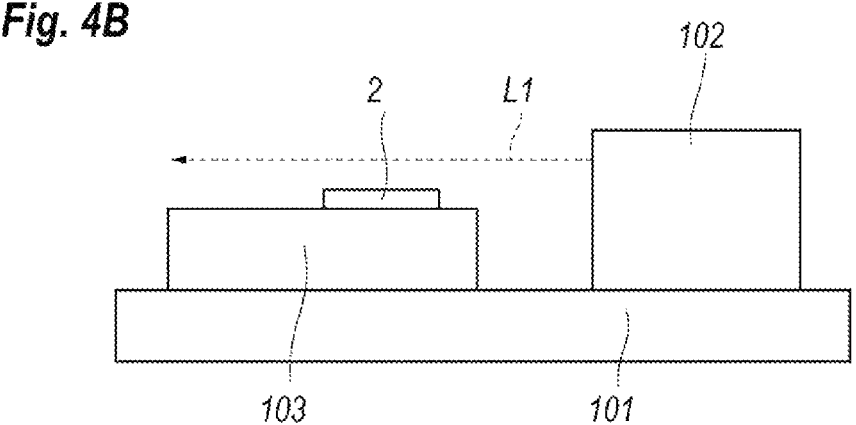
FIG. 4B shows a process of replacing the reference mirror with the housing.

Then, the process replaces the reference mirror 104 with the housing 2 that mounts the base 21 and the VOA carrier 20 therein, as FIG. 4B illustrates. The back surface of the housing 2 is closely contact to the top surface of the alignment stage 103. Because a height of the housing 2 is smaller than that of the reference mirror 104, the optical axis of the visual laser light L1 output from the auto-collimator 102 passes above the housing 2; that is, the visual laser light L1 does not enter within the housing 2.

Figure 5A:
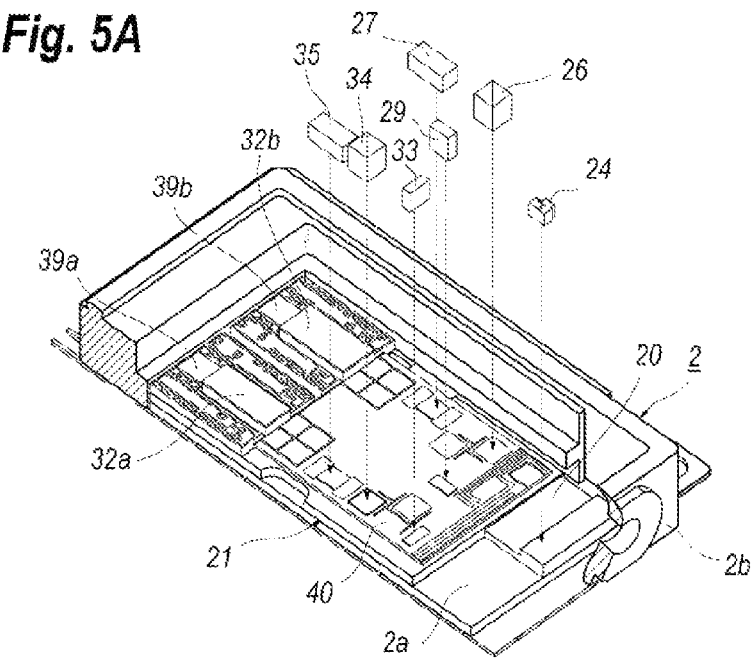
FIG. 5A shows a process of mounting a monitor photodiode (mPD) on a VOA carrier, a polarization beam splitter (PBS), skew adjustors, a half-wavelength plate, a polarizer and a beam splitter (BS) on the carrier.
Figure 5B:
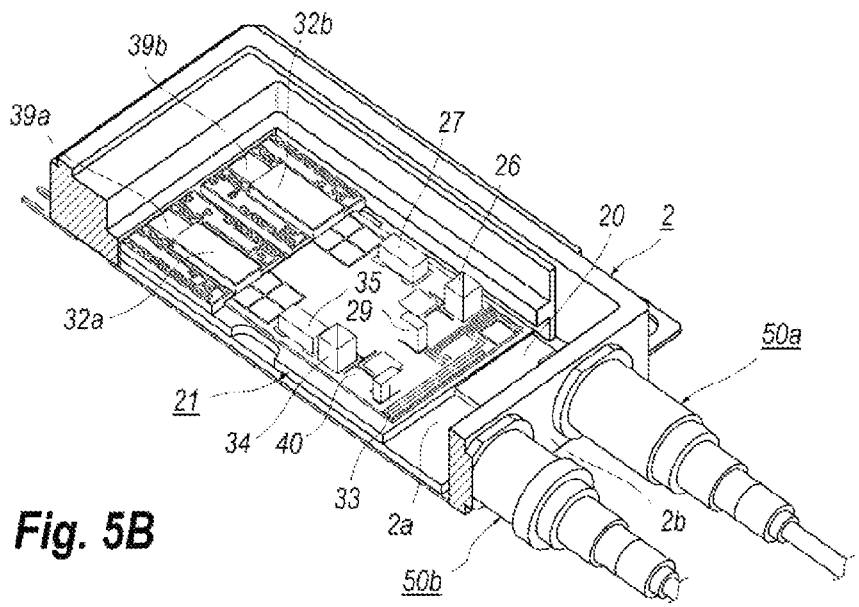
FIG. 5B shows a process of disposing test ports in a side of the housing.

Then, the process optically aligns the optical components. First, as shown in FIG. 5A, the process mounts the mPD 24 on the VOA carrier 20; and the PBS 26, the skew adjustors, 27 and 35, the half-wavelength plate 29, the polarizer 33, and the BS 34 on the carrier 40. These optical components are unnecessary to be actively aligned; only angles of the optical axes thereof are necessary to be adjusted.

That is, the process of aligning those optical components uses the auto-collimator 102 shown in FIGS. 4A and 4B to align the angle of the optical axes thereof. Specifically, reflecting the laser light L1 output from the auto-collimator 102 by one side of those optical components and overlapping the laser light L1 reflected by the one side with the laser light L1 entering the one side, the process may align the angle of those optical components. This angle alignment is carried out above the housing 2. Then, moving the components on the carrier 40, or the VOA carrier 20, exactly, on adhesive resin applied in respective positions where the optical components are placed, as keeping the angle thereof, or rotating by 90°, and curing the adhesive resin, the optical components may be fixed on the designed positions.

Because the PBS 26, the skew adjustors, 27 and 35, and the polarizer 33 in the beam incoming surfaces thereof front on the side 2b when they are installed within the housing 2; those components are aligned such that the incoming surfaces receive the laser beam L1 of the auto-collimator 102 and adjusted such that the optical axes of the beam incoming surfaces, namely, the normals of the beam incoming surfaces, coincident with the optical axis of the laser beam L1. After the alignment by the auto-collimator 102, those components are set on the base 21 as keeping the angle of the beam incoming surfaces. The half-wavelength plate 29 and the mPD 24 have the beam incoming surface thereof in perpendicular to the longitudinal axis of the housing 2; accordingly, after the alignment of the beam incoming surfaces by the auto-collimator 102 so as to coincide with the optical axis of the laser beam L1, those components are rotated by 90°, then, placed on the base 21. For the mPD 24, an additional process of the wire-boding to the terminal 3 is carried out after the placement on the base 21. The BS 24, which has the beam incoming surface facing laterally but the beam outgoing surface facing rearward, may be aligned in a surface opposite to the beam outgoing surface with the auto-collimator 102; then placed on the base 21 as keeping the angle thereof.

The process next installs other optical components except for those described above, which are involved in the second group of the optical components including the collimating lens 25, the first and second mirrors, 30 and 37, and four lens systems, 28, 31, 36, and 38, where those components have alignment tolerance against two optical hybrids, 32a and 32b, considerably smaller than those of the aforementioned components, 24, 26, 27, 29, and 33 to 35, of the first group. Accordingly, the active alignment with respect to the optical hybrids, 32a and 32b, becomes inevitable. The process first prepares test ports, 50a and 50b, which may be dummy connectors, on the side 2b of the housing 2 as described in FIG. 5B. These test ports, 50a and 50b, emulate the signal port 11 and the local port 13, respectively, and provide test beams for aligning the optical components of the second group. Next, the alignment process for the second group of the optical components will be described in detail.

FIG. 6A shows a functional block diagram of a setup for preparing the test beam. The setup includes a bias source 111 that provides biases to an optical source 112, which may be an LD, to generate the test beam. The test beam is provided in a polarization controller 113 to align the polarization plane of the test beam. The output of the polarization controller 113 reaches an optical connector 116 passing the optical coupler 114. The optical connector 116 is optically connected to one of connectors, 117 and 118, where the former connector 117 optically couples with the test port 50a, while, the latter connector 118 is connected to a power meter 119. The optical coupler 114 also couples with another power meter 115, or the setup shown in FIGS. 6A and 6B may switch one power meter for those power meters, 115 and 119. The other test port 50b also prepares the setup same with that described above.

First, engaging the optical connector 116 with the optical connector 118, the output power of the optical source 112 is set at a designed level as monitoring the power thereof by the power meter 119 and adjusting the bias source based on the monitored level. Then, switching the engagement of the optical connector 116 with the optical connector 118 to the other optical connector 117, the test ports, 50a and 50b, may be aligned in the optical axes thereof with the housing 2. Specifically, the test ports, 50a and 50b, are disposed so as to face the reference surface 104a of the reference mirror 104. The test beam, which is generated by the optical source 112, is output from the test ports, 50a and 50b, and reflected by the reference surface 104a, then returned to the test ports, 50a and 50b. The power meter 115 may detect the power of the reflected test beam through the optical coupler 114. The test ports, 50a and 50b, are positioned or aligned with respect to the reference mirror 104 such that the power thus detected by the power meter 115 becomes a maximum; that is, the test ports, 50a and 50b, in the optical axes thereof are aligned with the reference mirror 104.

After the alignment of the test ports, 50a and 50b, the process replaces the reference mirror 104 with the housing 2 as shown in FIG. 6B, and sets a fixture that provides one PBS and two mPDs in downstream of the test port 50a for adjusting the polarization plane of the test beam entering through the test port 50a within the housing 2. Monitoring magnitudes of two polarization components of the test beam by the two PDs, the polarization plane of the test beam may be adjusted by the polarization controller 113 such that the magnitudes of the respective polarization components become even.

In the adjustment of the polarization above described, some of terminals 3 may output the outputs of two mPDs provided in the fixture. Also, when the fixture prepares ports for two mPDs, the adjustment of the polarization controller 113 may be carried out in advance to set the housing 2 on the alignment stage 103. That is, in such a case, the adjustment of the polarization controller 113 may be carried out independent of the optical module 1A of the present invention.

Then, the process carries out the alignment of the test ports, 50a and 50b. First, the one of the optical hybrids 32a directly detects the test beam coming from the test port 50a by the PD built therein as sliding the test port 50a on the front side 2b of the housing 2. Also, another optical hybrid 32b detects the test beam coming from the test port 50b by the built-in PD as sliding the test port 50b on the front side 2b of the housing 2. The test beam has a field diameter of, for instance, 300 μm; while, the optical hybrids, 32a and 32b, provide optical input ports with dimensions of several micron-meters in a width and about one micron-meter in a height; accordingly, the signals output from the built-in PDs become faint but substantial for determining respective positions of the test ports, 50a and 50b, at which the test beams detected by the built-in PDs become respective maxima. Thus, the positions of the test ports, 50a and 50b, perpendicular to respective optical axes may be determined. As for the alignment of the test ports, 50a and 50b, along the optical axes thereof may be automatically determined by abutting or attaching the test ports, 50a and 50b, against the side 2b of the housing 2.

Next, other optical components involved in the second group, which need an precise alignment, are placed on respective optical paths between the optical hybrids, 32a and 32b, and the test ports, 50a and 50b, as detecting the test beams processed by the optical components by the built-in PD. The process does not restrict the order of the installation of the optical components described below. The order may be optional.

In the process for determining the positions of the test ports, 50a and 50b, the setup shown in FIG. 6B connects the VOA bias source 120 and the monitors, 121 and 122, to the housing 2. The VOA bias source 120 provides biases to the VOA 23, while, the monitors, 121 and 122, may monitor the outputs of the amplifiers, 39a and 39b.

After the determination of the test ports, 50a and 50b, the alignment process starts the practical alignment of respective optical components, that is, the BS 22 shown in FIGS. 1 and 2, is first aligned. The rotation angle of the BS 22 is aligned so as to maximize the reflection of the laser light L1, which is provided from the auto-collimator 102 and passing above the housing 2, at the front facet of the BS 22; then, the BS 22 is placed on the VOA carrier 20 as keeping the rotational angle thus adjusted. Moving the BS 22 on the VOA carrier 20 along the optical axis, the process determines the position of the BS 22 of the VOA carrier 20 at which the magnitude of the split beam detected by the mPD 24 becomes a maximum. Then, the BS 22 is permanently fixed thereto by curing the resin applied between the BS 22 and the VOA carrier 20.

Figure 7:
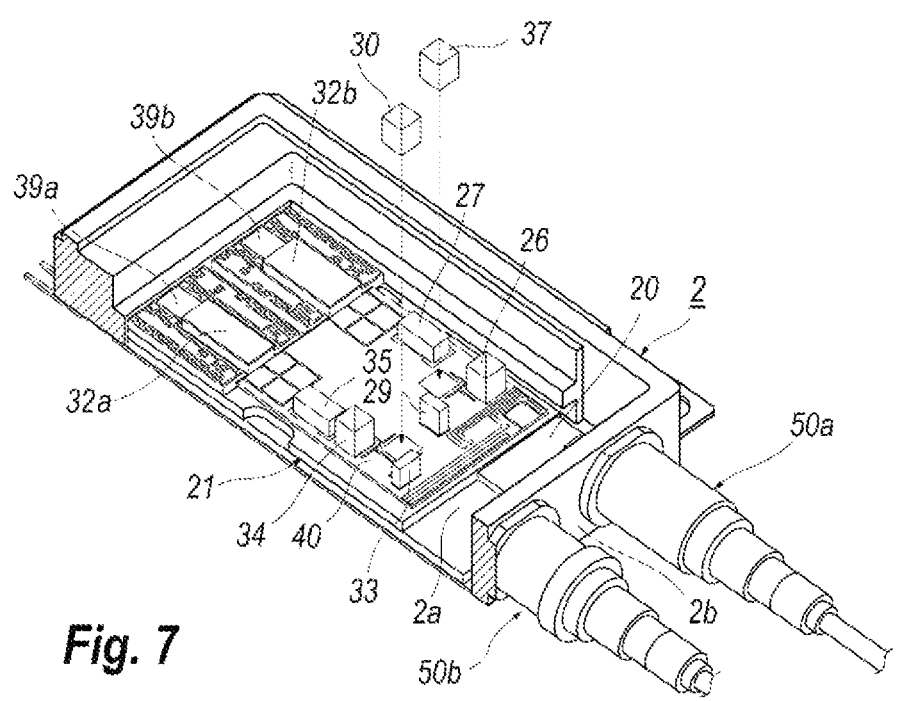
FIG. 7 shows a process of installing first and second mirrors on the carrier.

Next, as FIG. 7 indicates, the process places the first mirror 30 and the second mirror 37 on the carrier 40. The mirrors, 30 and 37, are adjusted in respective rotational angles thereof such that the laser light L1, which comes from the auto-collimator 102 and passes above the housing 2 is reflected at the front facets and detected in maximum by the auto-collimator 102. Then, keeping the rotational angles, the mirrors, 30 and 37, are placed on the carrier 40. Then, irradiating the mirrors, 30 and 37, by the test beams coming from the test ports, 50a and 50b, the process determines the rotational angles of the mirrors, 30 and 37, such that the test beams reflected by the mirrors, 30 and 37, and detected by the built-in PDs of the optical hybrids, 32a and 32b, become respective maxima. After the determination of the angles, the mirror, 30 and 37, are permanently fixed on the carrier by curing the resin applied thereto.

Figure 8A:
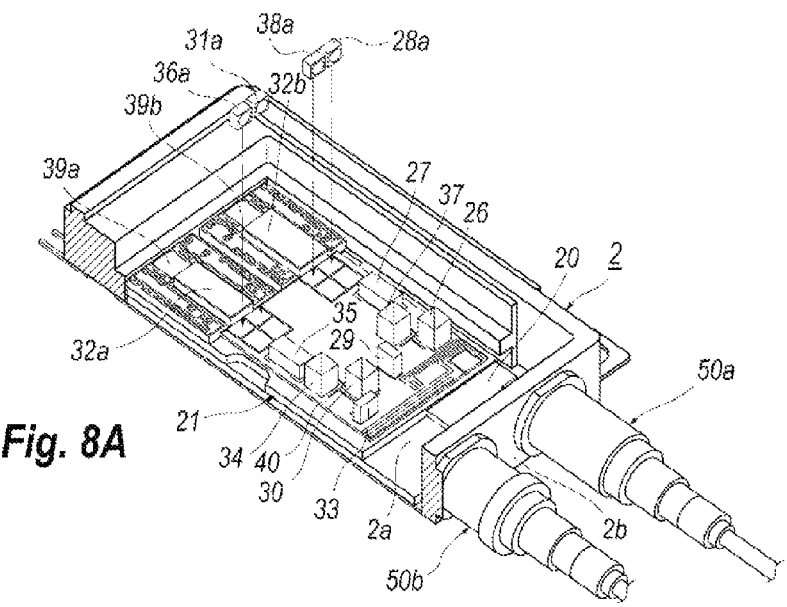
FIG. 8A shows a process of aligning and mounting first lenses positioned closer to the optical hybrids.

Next, the process determines the positions of the lens systems, 28, 31, 36, and 38, each including first and second lenses. The process first positions the first lenses, 28a, 31a, 36a, and 38a, namely, those placed closer to the optical hybrids, 32a and 32b, as FIG. 8A illustrates.

Figure 8B:
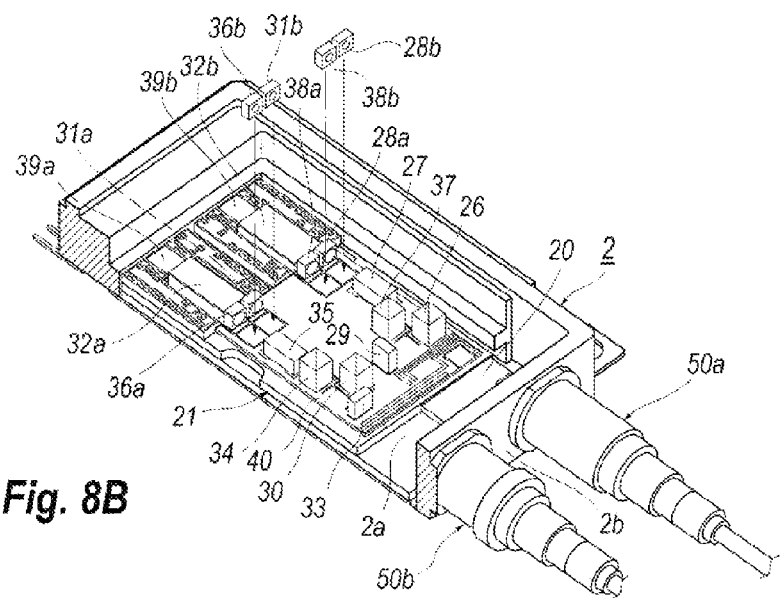
FIG. 8B shows a process of aligning and mounting second lenses positioned apart from the optical hybrids with respect to the first lenses.

Setting those first lenses, 28a to 38a on the carrier 40 as detecting the test beams that pass the first lenses, 28a to 38a, and concentrate onto the optical hybrids, 32a and 32b, by the built-in PDs, the first lenses, 28a to 38a, may be set in respective positions, namely, lateral replacements and a rotational angle, at which the outputs of the built-in PDs become maxima. The first lenses, 28a to 38a, are permanently fixed thereto on the carrier 40 by curing the adhesive resin. Then, as FIG. 8B illustrates, the process determines the positions of the second lenses, 28b to 38b, set apart from the optical hybrids, 32a and 32b, compared to the first lenses, 28a to 38a. The procedures to determine the positions and the rotational angles of the second lenses, 28b to 38b, are similar to those performed for the first lenses, 28a to 38a.

Figure 9A:
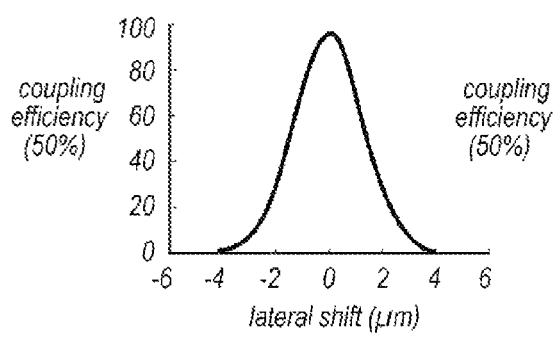
FIGS. 9A and 9B show alignment tolerances of the first lens in perpendicular and parallel to the optical axis, respectively, and FIGS. 9C and 9D also show alignment tolerances of the second lens in perpendicular and parallel to the optical axis.
Figure 9B:
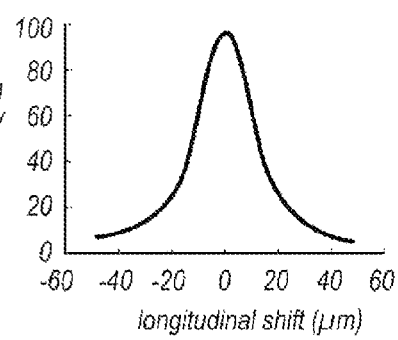
Figure 9C:
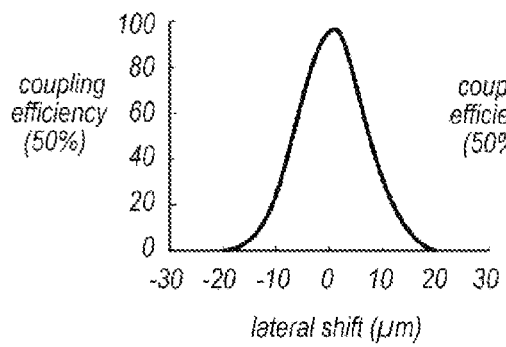
Figure 9D:
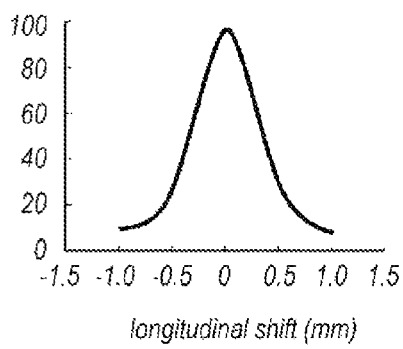

A reason why the optical module 1A of the present embodiment provides the lens systems, 28 to 38, having the two lenses are as follows. FIGS. 9A to 9D show behaviors of the optical coupling efficiency of the test beam with the optical hybrid through two lenses sequentially arranged along the optical axis of the test beam. FIGS. 9A and 9B shows positional tolerances of the first lens positioned closer to the optical hybrid in directions perpendicular to the optical axis (FIG. 9A) and in parallel to the optical axis (FIG. 9B), respectively. While, the alignment tolerances for the second lenses, namely, the lens set apart from the optical hybrid with respect to the first lens, in perpendicular to and in parallel to the optical axis are shown in FIGS. 9C and 9D, respectively. FIGS. 9C and 9D for the second lens assumes that the first lens is set on the designed position thereof.

The alignment tolerance in perpendicular to the optical axis is first considered. As FIG. 9A indicates for the first lens, the coupling efficiency drastically degrades with respect to the lateral shift, in perpendicular to the optical axis, of the first lens. Even when the deviation or the shift is merely one micron-meter, the coupling efficiency degrades over 30%. On the other hand for the second lens, as FIG. 9C illustrate, the coupling efficiency may be kept, or not degraded, for deviations around several micron meters. Substantial degradation in the coupling efficiency appears for deviations around several scores of micron meters. For the alignment tolerance in parallel to the optical axis the first lens, namely, the longitudinal shift thereof, as FIG. 9B indicates, several scores of micron meters brings substantial degradation; but, as FIG. 9D indicates, deviations of several scores of micron meters brings substantial no degradation in the coupling efficiency. Note that the horizontal unit of FIG. 9D is different from those of rest figures.

The first and second lenses are permanently fixed on the carrier 40 by, for instance, adhesive resin such as ultraviolet curable resin. Such resin generally shrinks a few micron meters during solidifying, which may sometimes cause fatal deviation of the positions of the lenses from once determined position. As FIG. 9A indicate, merely several one micron meter deviation from the designed position may bring substantial degradation in the optical coupling efficiency for the first lens set closer to the optical hybrid.

On the other hand, for the second lens set apart from the optical hybrid, deviation of several micron meters brings substantially no degradation in the optical coupling efficiency, in particular, as FIG. 9D indicates, the deviation of several scores of micron meters along the optical axis, the longitudinal shift, shows no contribution of the optical coupling efficiency. Thus, determining the positions of the first lenses, 28a to 38a, and fixing the first lenses, 28a to 38a, by solidifying the adhesive resin; the second lenses, 28b to 38b, may compensate the degradation of the optical coupling efficiency caused by the shrink of the adhesive resin during the solidification thereof.

The process described above has procedures of setting the first lenses, 28a to 38a, then setting the second lenses, 28b to 38b; that is two test ports, 50a and 50b, are concurrently providing the test beams in the respective ports. When the procedure uses the setup from the optical source 112 to the optical connector 116 shown in FIG. 6B common to two test ports, 50a and 50b; two lens systems, 28 and 38, which are for the optical hybrid 32b, are first assembled for the test port 50a, then, the rest lens systems, 31 and 36, for the other optical hybrid 32a are assembled for the test port 50b. This procedure may save troubles to switch the setup from the optical source 112 to the optical connector 116.

Also, the procedure described above fixes the first lenses, 28a to 38a, at respective positions at which the optical coupling efficiencies with the test ports, 50a and 50b, become respective maxima. However, the process may fix the first lenses, 28a to 38a, in positions offset by a preset distance from the positions at which the coupling efficiencies become maxima, then align the second lenses, 28b to 38b, in positions at which the coupling efficiencies between the test ports, 50a and 50b, and the optical hybrids, 32a and 32b, become maxima. Because, the position to give the maximum coupling efficiency only by the first lens is different from a position to give the maximum coupling efficiency combined with the second lens; the first lenses, 28a and 38a, are preferable to be offset, or apart from the positions at which the maximum coupling efficiencies are obtained only for the first lenses, 28a to 38a.

Figure 10A:
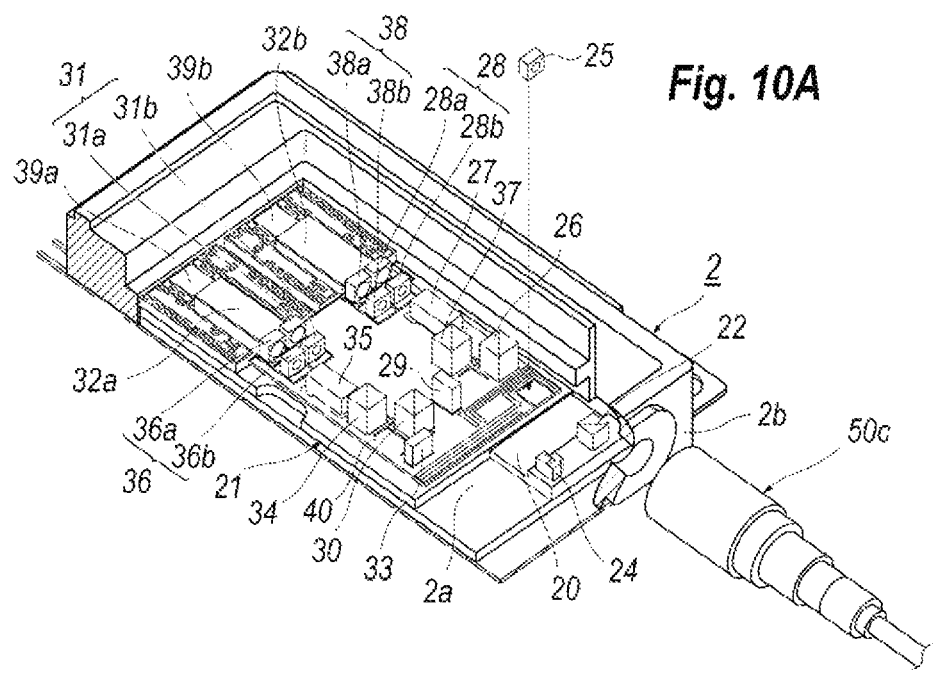
FIG. 10A shows a process of mounting a collimating lens in a front end for the signal light.

After the installation of four lens systems, 28 to 38, the process sets the collimating lens 25 as FIG. 10A indicates. As already explains, the signal port 11 secures the concentrating lens therein whose focal point in the side of the inside of the housing 2 substantially coincides with the focal point of the collimating lens 25 in the side of the signal port 11. Accordingly, the procedure first replaces the test port 50a with another test port 50c that secures a concentrating lens emulating the concentrating in the signal port 11. Because the concentrating lens in the signal port 11 concentrates the signal light provided from the SMF 10, and the VOA 23 in the aperture thereof is set substantially at the focal point of the concentrating lens, the VOA 23 may provide a narrowed aperture, which may make the VOA 23 compact, and show an enhanced extinction ratio of the beam passing therethrough.

Specifically, the process sets the reference mirror 104 on the alignment stage 103 again as aligning the reference surface 104a thereof by the auto-collimator 102, and faces a test port 50c against the reference surface 104a of the reference mirror 104. Then, the process determines an attitude, namely, a rotation and a tilt against the reference surface 104, such that the test beam output from the test port 50c, reflected by the reference surface 104a, and detected by the power meter 115 becomes a maximum. Thus, the test port 50c may be aligned with respect to the reference mirror 104. Then, the procedure replaces the reference mirror 104 with the housing 2 again, and aligns the test port 50c against the housing 2 within the plane perpendicular to the optical axis such that, as sliding the test port 50c on the side 2b of the housing 2, the test beam output from the test port 50c and detected through the built-in PD of the optical hybrid 32b becomes a maximum.

Then, the procedure moves the collimating lens 25 on the carrier 40 and aligns the collimating lens 25 by detecting the test beam output from the test port 50c, passing through the collimating lens 25, and detected by the built-in PD of the optical hybrid 32b. Finally, the collimating lens 25 is fixed by adhesive resin at a position where the output of the built-in PD of the optical hybrid 32b becomes a maximum.

Figure 10B:
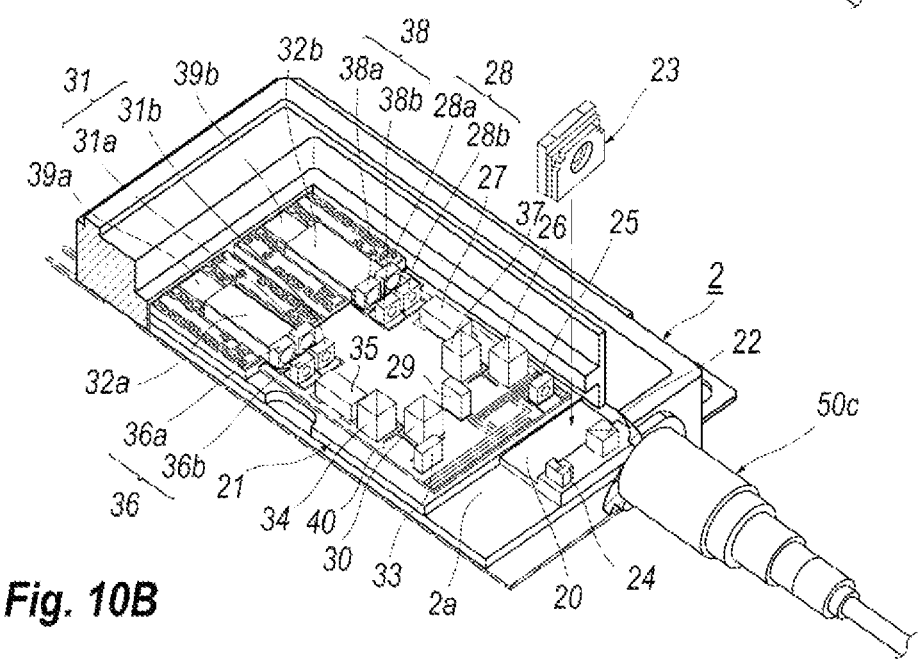
FIG. 10B shows a process of mounting a variable optical attenuator in front of the collimating lens.

Then, as FIG. 10B illustrates, the VOA 23 is fixed on the VOA carrier 20 by adhesive resin as making a substantial angle, which is 7° in the present embodiment, against the optical axis connecting the concentrating lens in the test port 50c and the collimating lens 25 in order to prevent light reflected thereby from returning the SMF 10. Also, the VOA 23 may be positioned such that, as practically provided with biases to modulate test beam coming from the test port 50c, the built-in PD of the optical hybrid 32b shows maximum amplitude of an AC signal.

Figure 11A:
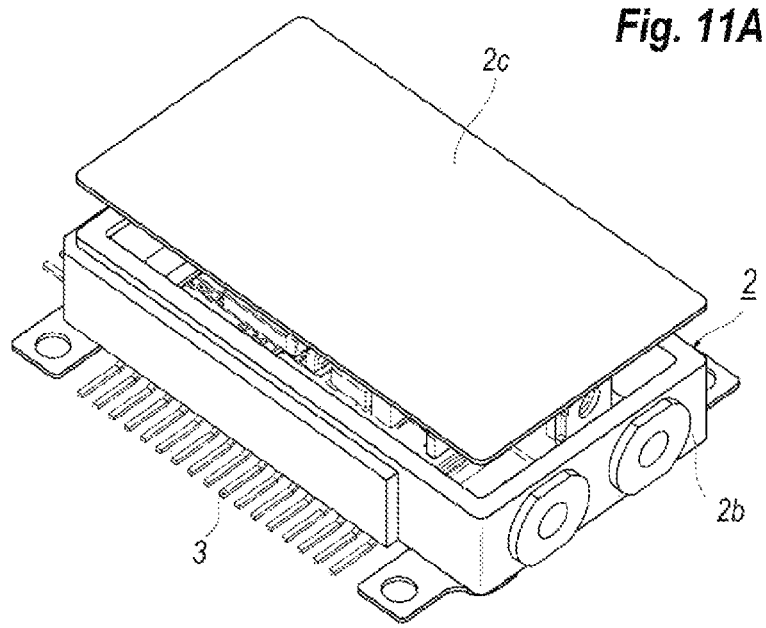
FIG. 11A shows a process of sealing the optical module by a lid.
Figure 11B:
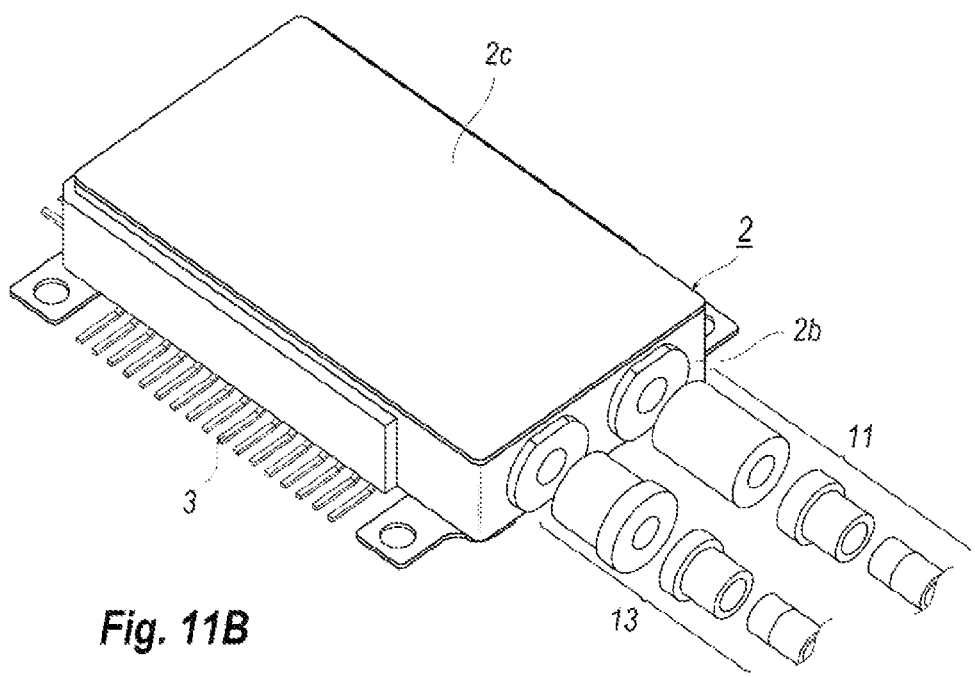
FIG. 11B shows a process of replacing the test ports with the signal port and the local port.

Finally, as FIGS. 11A and 11B illustrate, a lid 2c airtightly seals the housing 2, and the test ports are replaced with the signal port 11 and the local port 13. Specifically, the signal port 11 and the local port 13 are aligned in respective positions against the side 2b of the housing 2 at which the outputs of the built-in PDs of the optical hybrids, 32a and 32b, become respective maxima. After the alignment, the signal port 11 and the local port 13 are permanently fixed to the housing 2 by, for instance, the laser welding.

Figure 12A:
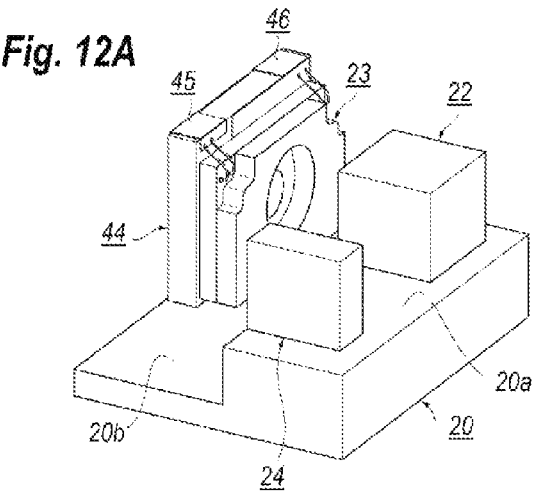
FIG. 12A is a perspective view of an assembly including the VOA, the BS, and the mPD provided on the VOA carrier 20.

FIG. 12A is a perspective view of the VOA 23, the BS 22, and the mPD 24 assembled on the VOA carrier 20. The VOA carrier 20 provides two top surfaces, 20a and 20b, forming a step therebetween. The upper surface 20a, which positions relatively forward, mounts the BS 22 and mPD 24, exactly, through a PD carrier with a side surface mounting the mPD 24, while, the lower surface 20b, which positions relatively rear, mounts the VOA 23 as facing the BS 22. Because the VOA 23 has outer dimensions greater than those of the BS 22, the step between the surfaces, 20a and 20b, may compensate this difference in the outer dimensions. Thus, the optical axis of the BS 22 may coincide with, or level with the optical axis of the VOA 23.

Figure 12B:
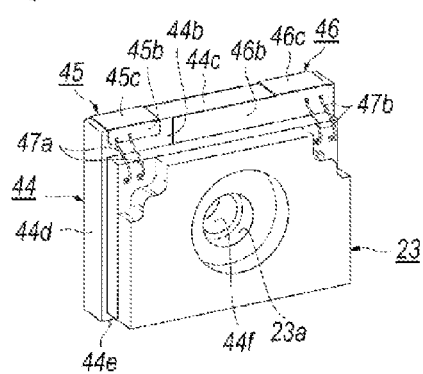
FIGS. 12B and 12C are perspective views of the VOA mounted on the VOA base, where
Figure 12C:
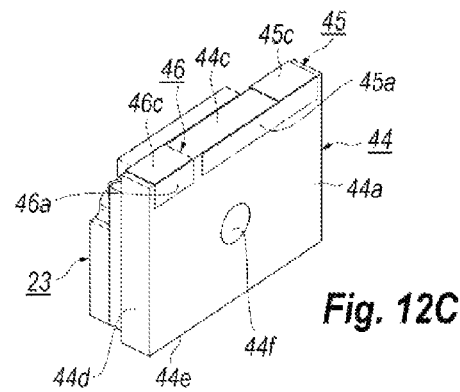

The VOA 23 of the present embodiment is mounted on a VOA base 44. Specifically, the VOA 23 is mounted on the VOA carrier 20 through the VOA base 44. FIGS. 12B and 12C are perspective views of the VOA 23 mounted on the VOA base 44, where FIG. 12B shows a front view, while, FIG. 12C shows a rear view thereof. The VOA base 44, which may be formed by an insulating material such as alumina ($Al_2O_3$), has a slab shape formed by a front 44a, a back 44b, a top 44c, and two sides, 44d and 44e. The back 44b faces the BS 22 and attaches the VOA 23 thereto. The VOA base 44 further provides an opening 44f that passes from the front 44a to the back 44b.

The VOA 23 is attached to the back 44b of the VOA base 44 by electrically conductive resin, which is often called as a silver paste. The aperture 23a of the VOA 23 continues to, or aligns with, the opening 44f of the VOA base 44 to pass the signal light therethrough. The VOA base 44 further provides interconnections, 45 and 46, each including portions, 45a and 46a, on the front 44a, portions, 45b and 46b, on the back 44b, and portions, 45c and 46c, on the top 44c that connect respective former portions, 45a to 46b. The portion 45a extends along a top edge of the front 44a. The portion 45b in the rear 44b is wire-bonded to one of electrodes of the VOA 23 via bonding wires 47a. The portion 46c of the interconnection 46, which is physically apart from the portion 45c of the interconnection 45, also provided on the top 44c of the VOA base 44. The portion 46b in the rear 44b, which is wire-bonded to the other electrode of the VOA 23 by boding wires 47b, extends along a top edge of the back 44b.

Figure 12D:
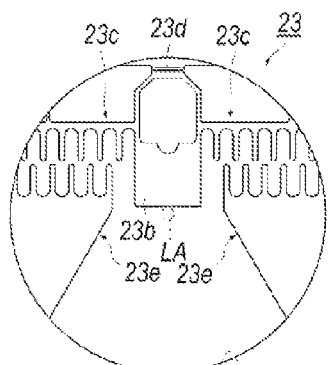

FIG. 12D magnifies the aperture 23a of the VOA 23 in a front view thereof. As FIG. 12D illustrates, the VOA 23 of the present embodiment is a type of MEMS VOA having a square shutter 23b with an edge of 50 µm. Comb-shaped electrodes 23c extend from respective sides of the shutter 23b. The comb-shaped electrode 23c is one of the electrodes of the VOA 23. The shutter 23b also continues to a body of the VOA 23 through elastic members 23d, where the body provides another comb-shaped electrode 23e which is the other electrode of the VOA 23. The comb-shaped electrode 23c and the other comb-shaped electrode 23e alternately arranged each other. That is, one of the combs of the comb-shaped electrode 23c is put between the combs of the other comb-shaped electrode 23e, and one of the combs of the comb-shaped electrode 23e is put between the combs of the other comb-shaped electrode 23c.

These two comb shaped electrodes, 23c and 23e, may be externally biased through bonding wires, 47a and 47b, the interconnections, 45 and 46, on the VOA base 44, and the terminals 3 from the outside of the optical module 1A. Biasing the comb shaped electrodes, 23c and 23e, which induces an attractive force therebetween, the shutter 23b may slide downward in FIG. 12D. For instance, applying 5 V between the electrodes, the shutter 23b may slide by 60 µm, at which the shutter 23b may overlap with, or completely hide the optical axis LA of the signal light SG, which is a state of 100% attenuation. Varying the magnitude of the bias, the shutter 23b may adjust a shift distance thereof, which means that the attenuation of the VOA 23 may be variable depending on the bias applied thereto.

Because, as FIG. 12D magnifies, the shutter 23b does not fully cover the aperture 23a of the VOA 23, but covers or hides only a center portion of the aperture 23a, which means that light in portions except for the center portion may pass the VOA 23 even when the shutter 23b is fully shifted downward. Accordingly, in order to obtain an enough extinction ratio for the VOA 23, the light is preferable to pass only the center portion of the aperture 23a with a narrowed field pattern. Thus, the signal light passing the VOA 23 is strictly preferable to be a collimated beam with a beam waist in a position thereof coincident with the shutter 23b. The optical module 1A of the present embodiment concentrates the signal light SG by the concentrating lens secured in the signal port 11 and the VOA 23 is positioned in the focal point in the side of the BS 22.

Figure 13:
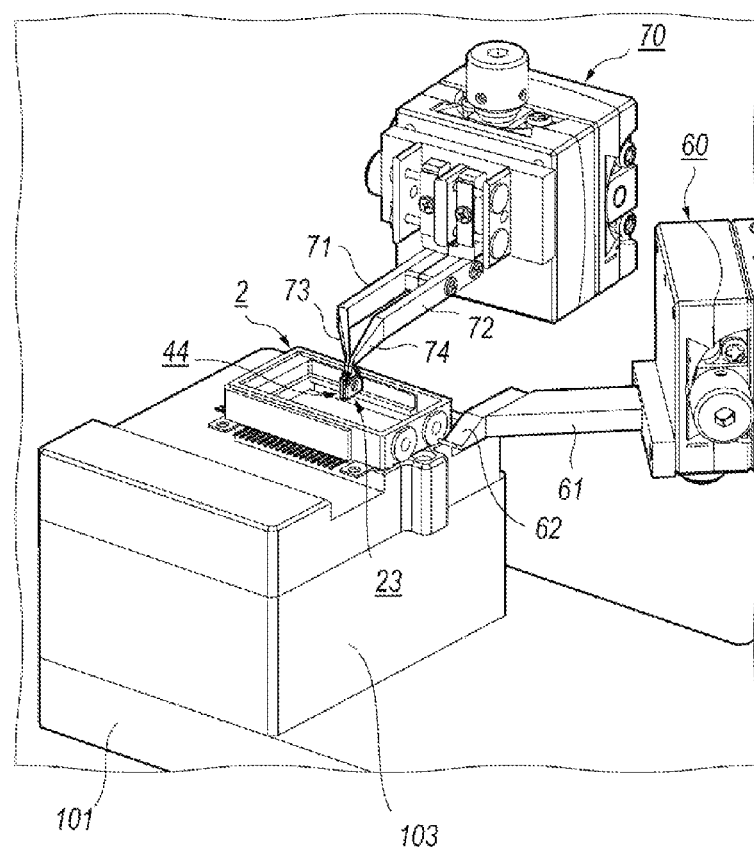
FIG. 13 illustrates a manipulator that holds the test port when the VOA is set within the housing.

FIG. 13 illustrates a manipulator 60 that holds the test port 50c when the VOA 23 is set within the housing 2. The manipulator 60 includes an arm 61 and an arm head 62. The arm 61 may adjust attitudes of the test port 50c supported by the arm head 62 in parallel to, in perpendicular to, and around the optical axis thereof. The apparatus for installing the VOA 23 provides another manipulator 70 that holds the VOA 23, exactly, the VOA base 44 attaching the VOA 23 thereto as performing the wire-boding between the interconnections, 45b and 46b, and the electrodes of the VOA 23. The manipulator 70 provides two arms, 71 and 72, each including arm heads, 73 and 74. A feature of the manipulator 70 is that the arms, 71 and 72, and the arm heads, 73 and 74, are made of electrically conductive material and may directly provide the biases to the VOA 23 picked up by the arm heads, 73 and 74. That is, when the manipulator 70 supports VOA base 44, one of the arm heads 73 picks and in contact to one of the interconnections 45, while, the other of the arm heads 74 picks and in contact to the other of the interconnections 46.

In the installation of the VOA 23 on the VOA carrier 20, an AC signal is applied to the VOA 23 through the arm heads, 73 and 74, and the interconnections, 45 and 46, where the AC signal has a frequency of, for instance, less than 1 Hz and an magnitude of 5 V. Detecting the test beam passing the VOA 23 by the built-in PD of the optical hybrid 32a, the VOA 23 is placed in a position at which the extinction ratio of the test beam becomes a maximum. Note that, in the installation of the VOA 23, the test beam passing the VOA 23 is detected by both built-in PDs of the optical hybrids, 32a and 32b, and the VOA 23 is positioned at which the output of the built-in PDs in the amplitudes thereof becomes substantially equal to each other. That is, the VOA 23 is set at the position where the attenuation of the test beam becomes even for two polarizations. Also, the VOA 23 is set slightly inclined with the optical axis of the test beam, for instance, making an angle of about 7° against the optical axis of the test beam in order to prevent the test beam, or the signal light, reflected by the VOA 23, exactly, by the shutter 23b of the VOA 23 from returning the signal port 11.

Figure 14:
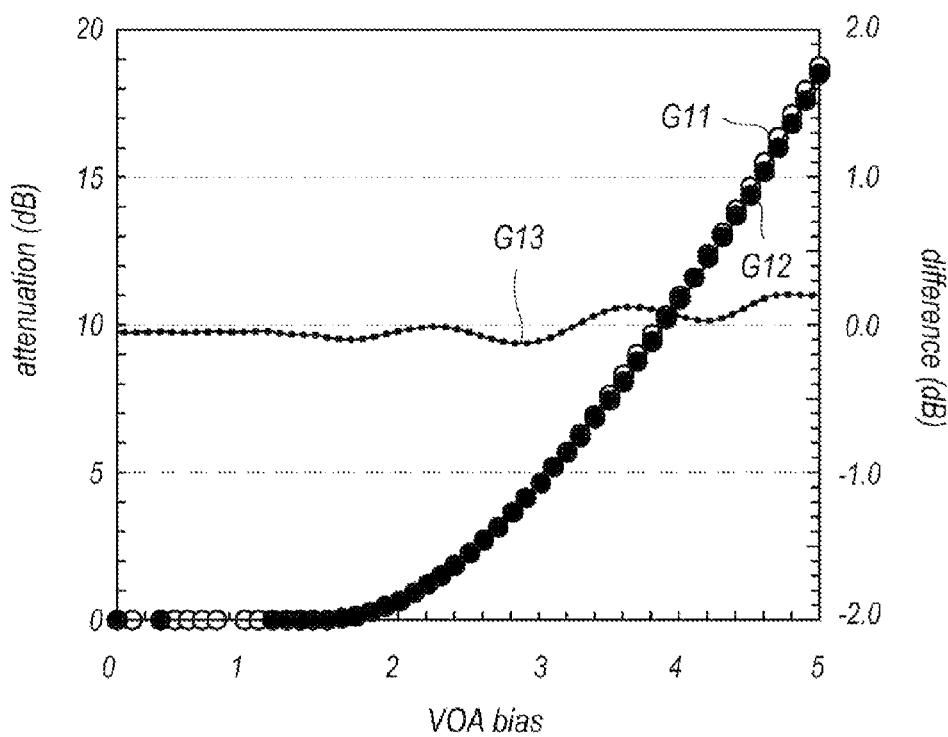
FIG. 14 shows an example of the attenuating performance of the VOA.

FIG. 14 shows an example of the attenuating performance of a VOA. In FIG. 14, a behavior G11 corresponds to the attenuation for the light having a polarization plane in parallel to the VOA carrier 20, namely, detected by built-in PD of the optical hybrid 32a, while, the other behavior G12 is the attenuation of the light having a polarization plane in perpendicular to the carrier, which is detected by the built-in PD of the optical hybrid 32b. A behavior G13 shows a difference between two behaviors, G11 and G12. When the bias is zero (0 V), the VOA 23 is opened in the shutter 23b thereof in the widest.

As FIG. 14 indicates, the VOA 23 increases the attenuation as the bias increases; but, the attenuation for respective polarizations is slightly different to each other. The difference in the attenuation becomes large as the bias increases. In the present embodiment, the difference between the polarizations may be compensated by aligning the position of the VOA 23 in three dimensions, namely, in parallel to the optical axis, in perpendicular to the optical axis and in parallel to the VOA carrier 20, and in perpendicular to the optical axis but in perpendicular to the VOA carrier 20. In the example shown in FIG. 14, the bias 4.5 V may set the attenuation greater than 12 dB and the biases of 0 to 5 V may keep the difference in the attenuation between the polarizations within ±0.5 dB.

Advantages of the process of forming the optical module 1A will be described. The process includes steps of: (1) preparing the reference mirror 104 that emulates the optical module 1A having the side 2b, to which the signal port 11 and the local port 13 are attached; (2) aligning the optical axis of the auto-collimator 102 with the optical axis of the reference mirror; (3) replacing the reference mirror 104 with the optical module 1A; (4) aligning the optical axes of the optical components installed within the optical module 1A with the optical axis of the auto-collimator 102, and (5) installing thus aligned optical components within the optical module 1A. The reference mirror 104 may be precisely aligned, on the alignment stage 103, with the optical module 1A. Thus, by setting the optical axis of the auto-collimator 102 using the reference mirror 104, the optical components in the optical axes thereof may be precisely aligned with the designed direction.

Because the optical module 1A of the embodiment builds photodiodes (PDs) within the optical hybrids, 32a and 32b, the process may further includes steps of: aligning the directions of the optical axes of the test ports, 50a and 50b, with the optical axis of the reference mirror 104; replacing the reference mirror 104 with the optical module 1A; and aligning the test ports, 50a and 50b, in the lateral directions perpendicular to the optical axes thereof with the optical module 1A as detecting the test beams output from the test ports, 50a and 50b, by the built-in PDs in the optical hybrids. Thus, the test ports, 50a and 50b, in the lateral directions perpendicular to the optical axes thereof and the directions of the optical axes may be precisely aligned with the optical module 1A, which may enhance the alignment characteristics of the optical components with respect to the test ports, 50a and 50b.

Also, the process of the present invention further includes, after the alignment of the test ports, 50a and 50b, steps of aligning the optical components forming the optical circuit coupling the signal light SG and the local light LO with the optical hybrids, 32a and 32b, in respective positions between the test ports, 50a and 50b, with respect to the test ports, 50a and 50b, as detecting the test beams output from the test ports, 50a and 50b, and processed by the optical components by the built-in PDs; and fixing the optical components on the carrier at respective positions where the outputs from the built-in PDs become maxima. Thus, the process of the invention may perform the active alignment for the optical components by the outputs from the built-in PDs.

The process further includes steps of, after the step of fixing the optical components, replacing the test ports, 50a and 50b, with the signal port 11 and the local port 13; and aligning those ports, 11 and 13, with the housing 2 by the active alignment using the built-in PDs, which may precisely align the signal port 11 and the local port 13.

The optical axis of the auto-collimator 102 may pass in a space above the housing 2, which enables to align the optical axes of the optical components with the optical axis of the auto-collimator 102 even after the housing 2 is set on the alignment stage 103.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. For instance, the process above described performs the alignment of both of the test ports, 50a and 50b, before the installation of the BS 22; however, the test ports 50b not subject to the BS 22 may be aligned after the installation of the BS 22 but before the installation of the mirror 37. Also, the alignment of the test ports, 50a and 50b, may be carried out just before the installation of the optical components, specifically, just before the installation of the BS, before the installation of the first mirror 30, and before the installation of the lens systems 28 and 31; while, the alignment of the other test ports 50b may be also carried out before the installation of the second mirror 37, before the installation of the lens systems, 36 and 38.

Also, the alignment of the auto-collimator 102 using the reference mirror 104 may be carried out before the installation of respective components that needs the alignment of the optical axes. For instance, before the installation of the BS 22, the first mirror 30, and/or the second mirror 37, where they needs the alignment of the optical axes thereof, the process replaces the housing 2 with the reference mirror 102, aligns the optical axis of the auto-collimator 102, aligns the optical axis of the optical components with respect to the auto-collimator 102, replaces the reference mirror 104 with the housing 2, aligns the test ports, 50a and 50b, with the housing 2, and finally installs the optical components within the housing 2, where the steps from replacing the reference mirror 104 with the housing 2 to aligning the test ports are carried out as holding the optical components are carried out as holding the optical components above the housing 2. Although the modified process above described increases the steps thereof, the alignment accuracy of the optical components and the ports, 11 and 13, may enhance.

The description above concentrates an arrangement where the optical module 1A provides two ports, namely, the signal port 11 and the local port 13; however, the process according to the present invention is not restricted to those arrangement. An optical module having a unique port may adopt the process for installing the optical components within the housing. Therefore, the present invention is not be limited to particular embodiment described above, but the invention includes all embodiment falling within the scope of claims below.

What is claimed is:

1. A process of assembling an optical module that provides an optical port, a front side to which the optical port is attached, an optical device, and optical components in a first group and a second group that optically couple the optical port with the optical device, the process comprising steps of:
  preparing a reference mirror that provides a reference surface emulating a front side of the optical module;
  aligning an optical axis of an auto-collimator with an optical axis of the reference surface of the reference mirror;
  replacing the reference mirror with the optical module;
  aligning optical axes of the optical components in the first group with the optical axis of the auto-collimator;
  installing the optical components in the first group within the optical module;
  replacing the optical module with the reference mirror;
  aligning an optical axis of a test port with the optical axis of the reference mirror by using a test beam output from the test port such that the test beam reflected by the reference surface and detected through the test port becomes a maximum;
  replacing the reference mirror with the optical module;
  aligning the test port with the optical module as detecting the test beam provided from the test port by an optical detector built-in the optical device;
  aligning an optical axis of optical components in the second group as monitoring the test beam processed by the optical components in the second group by the optical detector built-in the optical device; and
  fixing the optical components in the second group within the optical module.

2. The process of claim 1,
wherein the optical device is an optical hybrid and the optical detector is a semiconductor photodiode built-in the optical hybrid.

3. The process of claim 1,
further including steps of:
  after the step of fixing the optical components in the second group,
  replacing the test port with the optical port;
  aligning the optical port as monitoring an optical signal output from the optical port and processed by the optical components in the first and second groups by the optical detector built-in the optical device; and
  fixing the optical port to the optical module.

4. The method of claim 3,
wherein the optical module further including a variable optical attenuator (VOA) whose attenuation depends on a bias applied thereto,
wherein the method including steps of:
  after the step of fixing the optical port,
  installing the VOA within the optical module as supplying the bias to the VOA and detecting the optical signal passing through the VOA and processed by the optical components in the first and second groups by the optical detector built-in the optical device.

5. The method of claim 4,
wherein step of installing the VOA includes steps of:
  holding the VOA by a pair of arms;
  supplying the bias to the VOA through the pair of arms, where the bias is an AC signal with a frequency of around 1 Hz.

6. The process of claim 1,
wherein the optical components installed within the optical module in the first group have optical coupling tolerance greater than an optical coupling tolerance of the optical components in the second group.

7. The process of claim 1,
wherein the optical device includes an optical hybrid; the components in the first group include at least one of a beam splitter, a polarization beam splitter, a half-wavelength plate, and a polarizer; and the optical components in the second group include at least one of a cubic mirror and a lens.

8. The process of claim 1,
wherein the optical module includes
  two optical hybrids as the optical device; and a signal port and a local port as the optical port,
wherein the optical components in the first group include a polarization beam splitter (PBS) optically coupled with the signal port, a beam splitter (BS) optically coupled with the local port, and an optical polarizer placed between the local port and the BS; and
wherein the topical components in the second group include a first lens system arranged between one of the optical hybrid and the PBS; a half-wavelength plate, a first mirror, and a second lens system each arranged between the PBS and another of the optical hybrid; a third lens system arranged between the BS and the another of the optical hybrid; and a second mirror and a fourth lens system each arranged between the BS and the one of the optical hybrid.

9. The method of claim 1,
wherein the optical axis of the auto-collimator passes above the optical module.

10. A process of assembling an optical module that provides an optical device with a built-in optical detector, an optical port in a front side thereof, and optical components optically coupling the optical port with the optical device, the process comprising steps of:
  preparing a reference mirror and a test port, the reference mirror providing a reference surface emulating the front side of the optical module, the test port outputting a test beam;
  aligning an optical axis of the test port with the optical axis of the reference mirror such that the test beam output from the test port, reflected by the reference surface, and detected through the test port becomes a maximum; and
  replacing the reference mirror with the optical module.

11. The process of claim 10,
further including a step of:
  aligning an optical axis of the optical components as monitoring the test beam processed by the optical components by the built-in optical detector.

12. The process of claim 11,
wherein the optical device includes an optical hybrid.

* * * * *